C. LUBBE & L. H. FREE.
DEMOUNTABLE RIM.
APPLICATION FILED JAN. 31, 1916.
1,243,313.
Patented Oct. 16, 1917.
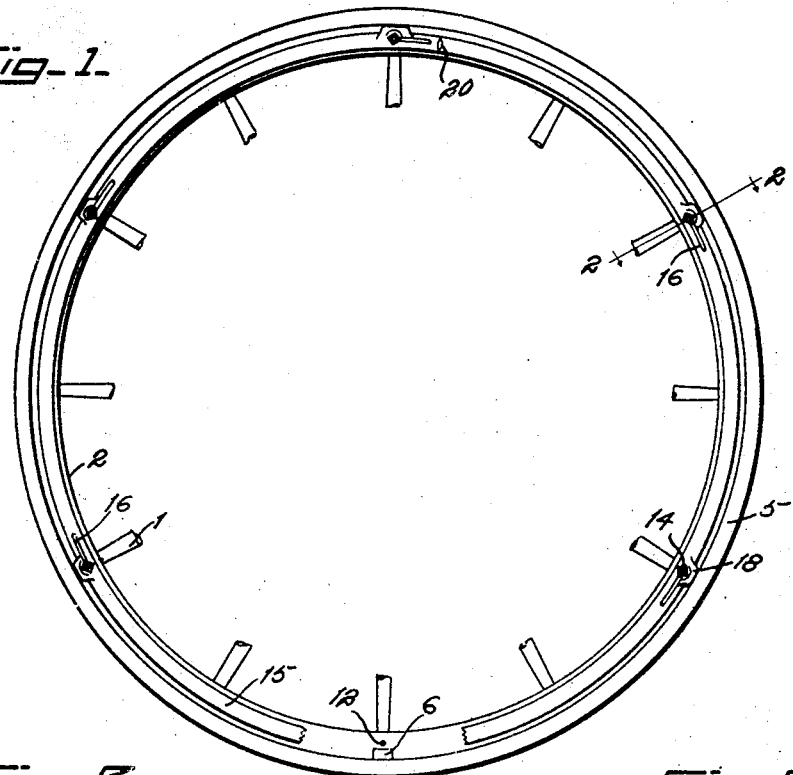
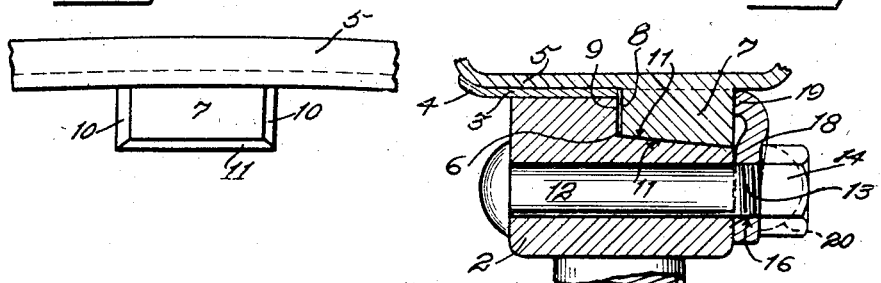
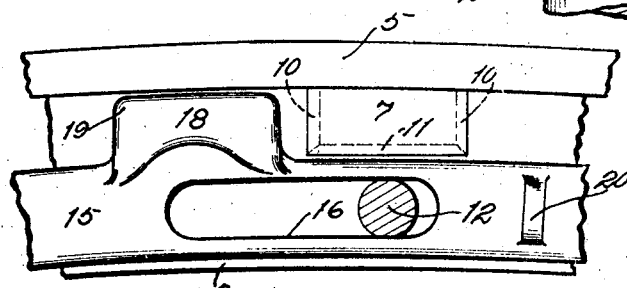
WITNESS
INVENTORS
C. Lubbe
L. H. Free
BY
ATTORNEYS.

UNITED STATES PATENT OFFICE.

CHARLES LUBBE AND LEONARD H. FREE, OF SAN FRANCISCO, CALIFORNIA.

DEMOUNTABLE RIM.

1,243,313.   Specification of Letters Patent.   Patented Oct. 16, 1917.

Application filed January 31, 1916. Serial No. 75,232.

*To all whom it may concern:*

Be it known that we, CHARLES LUBBE and LEONARD H. FREE, citizens of the United States, residing at the city and county of San Francisco and State of California, have invented certain new and useful Improvements in Demountable Rims, of which the following is a specification.

The present invention relates to vehicle wheels and more particularly to means for securing a demountable rim to vehicle wheels, whereby the rim is capable of being easily removed from and positioned on a vehicle wheel, and one wherein there is employed a single locking member carrying a plurality of locking lugs or members which are adapted on an oscillation of the locking member on the felly to be positioned over suitable bosses on the rim and prevent the same from being withdrawn from the felly. A further object of our invention is to provide an efficient construction which is capable of being cheaply manufactured and which may be easily and quickly operated when it is desired to remove a rim from or position a rim on the wheel.

With the above mentioned and other objects in view, the invention consists in the novel construction and combination of parts hereinafter described, illustrated in the accompanying drawings and pointed out in the claim hereto appended, it being understood that various changes in the proportion, form, size or minor details of construction within the scope of the claim may be resorted to without departing from the spirit or sacrificing any of the advantages of the invention.

To more fully comprehend the invention reference is directed to the accompanying drawings, wherein—

Figure 1 is a view in side elevation of an embodiment of our invention applied to a vehicle wheel with the locking ring in position with the lugs carried thereby coöperating with the bosses on the rim and locking the rim on the felly.

Fig. 2 is a sectional view taken on line 2—2 of Fig. 1.

Fig. 3 is a view in end elevation of one of the bosses carried by the rim, disclosing the taper of the side and bottom walls thereof.

Fig. 4 is a view in side elevation of a portion of the wheel and rim with the locking ring moved to a position where the lugs uncover the bosses on the rim and the rim is permitted to be removed from the felly.

In the drawings, wherein like characters of reference designate corresponding parts,—the numerals 1 indicate the wheel spokes mounting the felly 2 mounting on its periphery the plate 3 curved upwardly on its inner edge, as at 4, to support and limit the inward movement of the rim 5 which is removably positioned thereon.

The felly 2 is made of any suitable material and is provided with a series of radially disposed inwardly tapering seats or sockets 6 which are spaced from each other on the periphery of the rim.

The sockets are disposed inwardly toward the center of the felly and are substantially rectangular in shape. The width of the sockets is less than that of the felly, as in Fig. 2, and each receives an inwardly tapering boss 7 disposed inwardly from the inner periphery of the rim 5 and which are of a width slightly less than that of the sockets, so that when the rim is in position the inner walls 8 and 9 of the respective sockets and bosses will lie in slight spaced relation, as in Fig. 2. The side and bottom walls 10 and 11 of the sockets 6 and bosses 7 are inwardly tapered, as in Figs. 2, 3 and 4 to provide a wedging action therebetween when the rim is in position and said tapered walls prevent any circumferential movement of the rim on the felly.

A securing bolt 12 extends through the felly, beneath each of the sockets 6 and the threaded ends 13 thereof project beyond the outer side edge of the felly and receive the nuts 14.

A suitable annulus or ring 15 lies flat against the outer face of the felly 2, and is provided with a plurality of circumferentially disposed arcuate slots or openings 16 through each of which is adapted to extend the threaded end 13 of one of the bolts 12; the slots permitting of a limited circumferential movement of the ring 15 relative to the outer face of the felly when the nuts 14 are loose on the bolts.

The ring 15 is of such a diameter and is so positioned on the felly that the peripheral edge 17 thereof falls short of projecting over the sockets 6. Retaining or locking lugs 18 project outwardly from the peripheral edge 17 of the rim 15 immediately over corresponding ends of the arcuate slots 16, and the upper ends of said lugs are inturned, as at 19, and are adapted to bear against the outer faces of the bosses 7 when it is desired to secure the rim in position on the felly, as in Fig. 1. One or more studs or projections 20 are formed on the outer face of the ring 15 to provide a shoulder for receiving a blow to move the ring 15 relative to the felly, should the same not be free after the nuts 14 are loose on the bolts.

To position a rim on or remove one from the felly, the nuts 14 must be first loose on the bolts 12 and the ring moved relative to the bolts until the lugs 18 are at one side of their respective sockets and bosses, as in Fig. 4, at which time the rim may be slipped from the felly. When it is desired to lock a positioned rim on the felly, it is only required that the ring 15 be oscillated to position the locking lugs 18 over their coöperating bosses and then tighten the nuts 14 which are, when the ring is thus positioned, immediately below the lugs 18 and bear directly thereonto.

It will be observed that it is not necessary to remove any part of the locking mechanism from the felly to remove the rim, but that the ring 15 is oscillated on the face of the rim to position the locking lugs over or remove the same from in front of the bosses.

Having thus described our invention, what we claim as new and desire to protect by Letters Patent is:—

In a vehicle wheel, a felly formed on its periphery with transversely disposed sockets open at one end and the walls of said sockets converging toward the inner end thereof, a demountable rim for positioning over said felly and provided with a plurality of inwardly extended bosses for reception one in each of said sockets, and the walls of said bosses converging toward the inner end thereof, a securing bolt carried by said felly below each of said sockets, said bolts projecting at one end beyond one face of said felly, a ring provided with a slot for the reception of the projecting ends of each of said bolts, said ring adapted for positioning adjacent the face of said felly formed with the open ends of said sockets and said ring provided on its periphery with a plurality of radially disposed lugs arranged one over corresponding open ends of each of said slots and capable of limited rotary movement relative to said felly within the limits of said slots to position said lugs on said bosses, and a nut coöperating with each of said bolts for retaining said ring in its adjusted position and for forcing said lugs into contact with said bosses.

In testimony whereof we have signed our names to this specification in the presence of two subscribing witnesses.

CHARLES LUBBE.
LEONARD H. FREE.

Witnesses:
HARRY A. TOTTEN,
D. B. RICHARDS.